United States Patent
Oda

(10) Patent No.: US 6,636,263 B2
(45) Date of Patent: Oct. 21, 2003

(54) DIGITAL CAMERA HAVING A CONTINUOUS PHOTOGRAPHY MODE

(75) Inventor: Katsunari Oda, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/874,687

(22) Filed: Jun. 5, 2001

(65) Prior Publication Data

US 2002/0018142 A1 Feb. 14, 2002

(30) Foreign Application Priority Data

Jun. 15, 2000 (JP) ........................................ 2000-179890

(51) Int. Cl.[7] ........................ H04N 5/222; H04N 5/235; G03B 7/00
(52) U.S. Cl. ........................................ 348/370; 348/362
(58) Field of Search ................................ 348/366, 370, 348/371, 362, 229.1; 396/204, 167, 166, 155, 157, 169, 205

(56) References Cited

U.S. PATENT DOCUMENTS

| | | | | |
|---|---|---|---|---|
| 3,868,701 A | * | 2/1975 | Kawasaki | 396/157 |
| 4,210,849 A | * | 7/1980 | Naya et al. | 315/241 |
| 4,266,163 A | * | 5/1981 | Lloyd | 315/151 |
| 4,535,758 A | * | 8/1985 | Longacre, Jr. | 358/168 |
| 4,768,876 A | * | 9/1988 | Okino | 356/4 |
| 5,099,262 A | | 3/1992 | Tanaka et al. | 396/312 |
| 5,155,581 A | * | 10/1992 | Tanaka et al. | 358/29 |
| 5,198,855 A | * | 3/1993 | Iwai | 354/414 |
| 5,398,065 A | * | 3/1995 | Okino | 348/371 |
| 5,559,552 A | * | 9/1996 | Inuiya et al. | 348/220 |
| 5,708,873 A | * | 1/1998 | Kobayashi | 396/159 |
| 5,986,705 A | * | 11/1999 | Shibuya et al. | 348/362 |
| 6,351,606 B1 | * | 2/2002 | Yamazaki | 396/61 |

FOREIGN PATENT DOCUMENTS

JP 05-167910 A 7/1993

* cited by examiner

Primary Examiner—Andrew Christensen
Assistant Examiner—Tia M. Harris
(74) Attorney, Agent, or Firm—Sidley Austin Brown & Wood LLP

(57) ABSTRACT

When the flash emission mode is set in continuous photography, the amount of emission of the built-in flash during continuous photography and the charge amount of the main condenser needed to realize this light emission are estimated. The gain is increased from a standard value when the charging time for obtaining the aforesaid charge amount is greater than the continuous frame speed. In this way continuous photography is accomplished while the shutter button is fully pressed without reducing the continuous frame speed.

6 Claims, 8 Drawing Sheets

AF evaluation value $X_n = \Sigma |\Delta ij|$
$(\Delta ij = X_{i+1,j} - X_{i,j})$

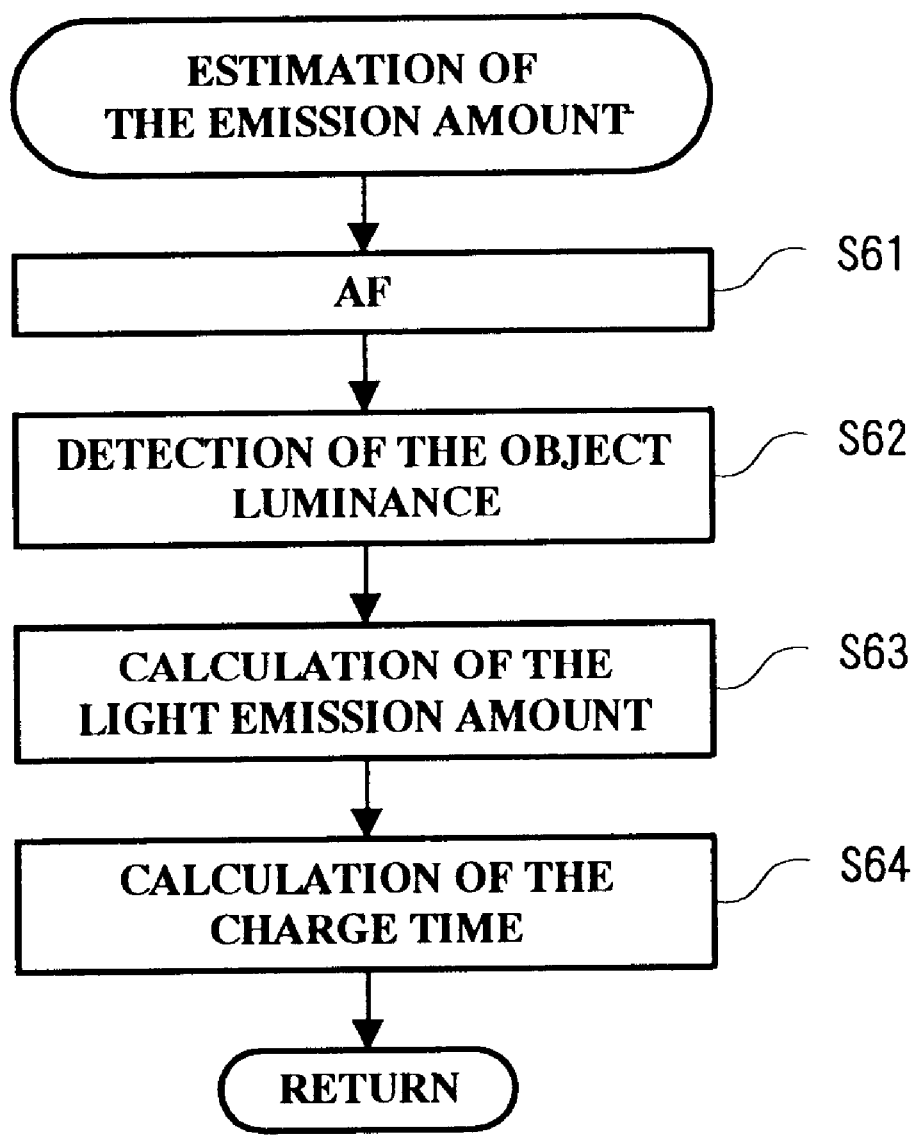

DIGITAL CAMERA HAVING A CONTINUOUS PHOTOGRAPHY MODE

This application is based on Patent Application No. 2000-179890 filed in Japan, the content of which is hereby incorporated by reference.

BACKGROUND OF THE INVENTION

1. Field of the Invention

The present invention relates to a digital camera provided with a flash for illuminating an object during photography, and having at least a continuous photography mode.

2. Description of the Related Art

Digital cameras convert an optical image from an object to an electrical image, and record each electrical image signal in a memory medium such as a magneto-optical disk, removable semiconductor memory or the like of a card type corresponding to conventional film, and such digital cameras are seen more and more in recent years in place of cameras using conventional silver halide film (hereinafter referred to as "silver halide camera").

Most digital cameras are provided with a built-in flash, and accomplish photography using the light emission when an object is dark (refer to U.S. Pat. No. 5,099,262).

On the other hand, digital cameras often are capable of switching the photography mode, single photo/continuous photo mode, and switching between light emission and non-flash similar to silver halide cameras.

In the aforesaid conventional digital camera, when a flash is used during continuous photo, the battery must be recharged after each light emission. A disadvantage arises for the aforesaid reason in that the frame speed in continuous photography (number of continuous photo frames per unit time) when the flash is used is reduced compared to continuous photography without light emission.

An object of the present invention is to eliminate the disadvantages of the conventional art, and provide a digital camera capable of attaining a continuous photography frame speed with light emission identical to that of continuous photography without light emission.

SUMMARY OF THE INVENTION

These objects are attained by the digital camera of the present invention comprising: an image sensor for sensing an object image; a light emission device for illuminating the object during photography; a chargeable power source for supplying power to the light emission device; an adjustor for adjusting a gain of the output of the image sensor; a determining portion for determining an amount of light emission of the light emission device in the photography; a charge time calculator for calculating a charge time of the power source needed after light emission based on the determined amount of light emission; a discriminator for discriminating whether or not a frame speed in the continuous photography mode is reduced based on the calculated charge time; and a gain controller for controlling the adjuster so as to increase the gain when it has been discriminated that the frame speed is reduced.

BRIEF DESCRIPTION OF THE DRAWINGS

In the following description, like parts are designated by like reference numbers throughout the several drawings.

FIG. 13 is a flow chart showing the emission amount estimation process in a second embodiment.

DETAILED DESCRIPTION OF THE PREFERRED EMBODIMENTS

The embodiments of the present invention are described hereinafter with reference to the accompanying drawings.

1. First Embodiment

A. General Structure

FIGS. 1 through 4 respectively show a front view, back view, side view, and bottom view of a digital camera 1A of an embodiment of the present invention. FIG. 5 is a block diagram showing the internal structure of the digital camera 1A.

Figure 1:
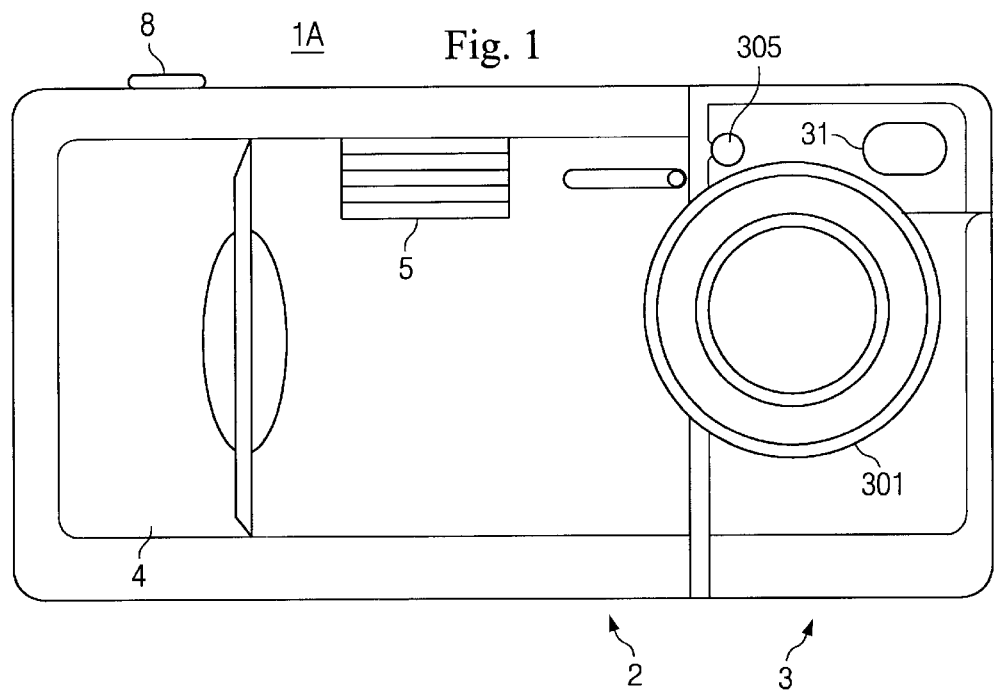
FIG. 1 is a front view of a digital camera of an embodiment of the present invention.

The digital camera 1A comprises a box-like camera body 2, and a rectangular image sensing unit 3 (indicated by the thick lines in FIGS. 1, 2, and 4) as shown in FIG. 1. The image sensing unit 3 has a macro function zoom lens 301 acting as a taking lens, and is provided with an image sensing circuit 302 having a CCD 303 (refer to FIG. 5) acting as a ½ inch size CCD color area sensor disposed at a suitable position behind the zoom lens 301.

A light adjusting control circuit 304 having a light adjusting control sensor 305 for receiving the reflected light of the flash from the photographic object is provided at a suitable location within the image sensing unit 3 similar to a camera using silver halide film. In addition, an optical finder 31 is provided at suitable locations within the image sensing unit 3.

On the front surface of the camera body 2 is provided a grip 4 on the left end and a built-in flash 5 on the top center, and a shutter button 8 is provided on the top surface, as shown in FIG. 1.

Figure 2:
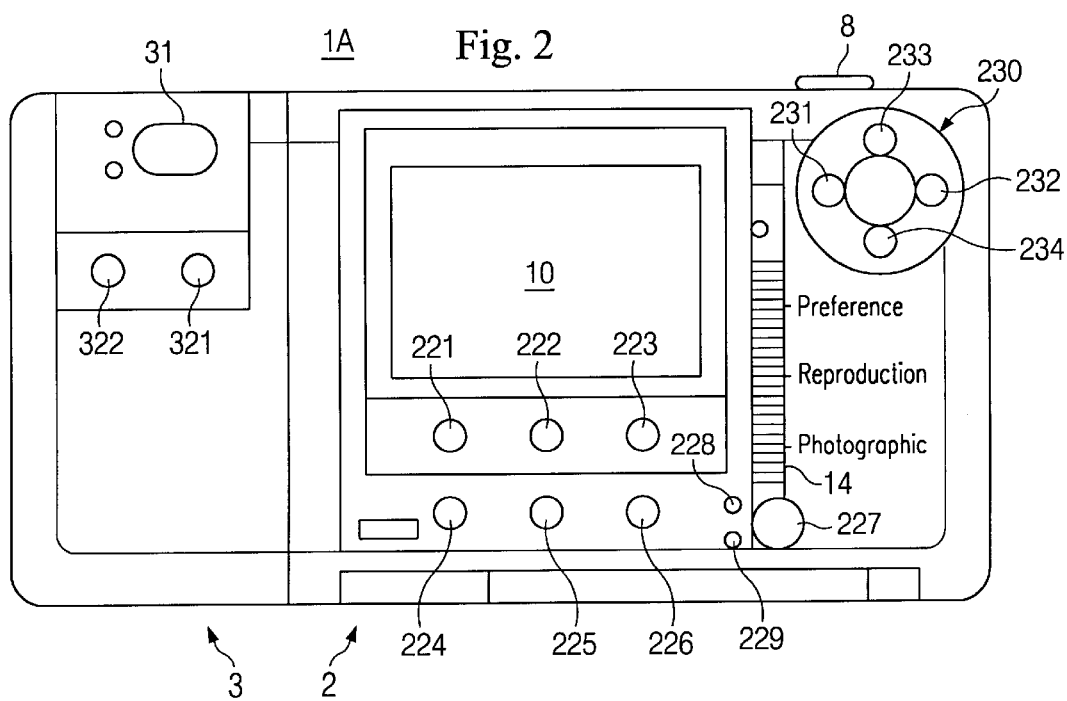
FIG. 2 is a back view of a digital camera of an embodiment of the present invention.

On the back surface of the camera body 2 is provided an LCD 10 as a photographic image monitor display (equivalent to a viewfinder), and for displaying the recorded images at the approximate center of the back surface as shown in FIG. 2. Below the LCD 10 are provided key switches 221–226 for operating the digital camera 1A, and a power switch 227. The flash emission mode can be selected by pressing the key switch 222. Specifically, automatic flash emission mode, force flash emission mode, and flash prohibition mode are sequentially selected by pressing the key switch 222 a number of times.

On the left side of the power switch 227 are arranged an LED 228 which lights when the power is ON, and an LED 229 which displays while a memory card is being accessed.

Also on the back surface of the camera body 2 is a mode setting switch 14 for selecting among [photographic mode], [reproduction mode], and [preference mode] (refer to FIG. 2). The photographic mode is used for taking photographs. The reproduction mode is a mode for reproducing a photographed image recorded on a memory card 91 and displaying the image on the LCD 10. The preference mode is a mode for settings of various types by selecting a desired item from among display items (setting items). The operations in each mode are described later.

The mode setting switch 14 is a slide switch and sets the photographic mode when at the bottom, sets the reproduction mode at the center, and sets the preference mode at the top, as shown in FIG. 2.

A 4-point switch 230 is provided on the right side of the back surface of the camera. In the photographic mode, a zoom motor 307 (refer to FIG. 5) drives the zoom lens 301 for zooming by pressing the buttons 231 and 232. The zoom lens 301 is driven to the wide side when button 231 is pressed, and driven to the telecentric side when the button 232 is pressed.

The execution of autofocus in the digital camera 1A is described later, but manual focusing is accomplished by user operation to drive an AF motor 308 via a general controller 211 through an AF motor drive circuit 216 when buttons 233 and 234 are pressed, so as to move the zoom lens 301.

On the back of the image sensing unit 3 are provided an LCD button 321 for turning ON and OFF the LCD 10, and a macro button 322. When the LCD button 321 is pressed, the LCD display is switched ON or OFF. For example, during photography using only the optical finder 31, the LCD display is switched OFF to conserve power. When the macro button 322 is pressed during macro photography, an AF motor 308 (refer to FIG. 5) is driven to place the zoom lens 301 in the macro photography enabled state.

Figure 3:
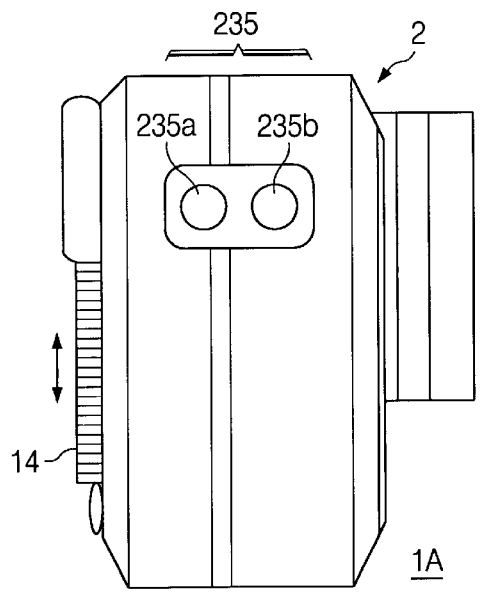
FIG. 3 is a side view of a digital camera of an embodiment of the present invention.

On the side of the camera body 2 is provided a pin unit 235, as shown in FIG. 3. The pin unit 235 is provided with a DC input pin 235a, and a video-out pin 235b for outputting the content displayed on the LCD 10 to an external video monitor.

Figure 4:
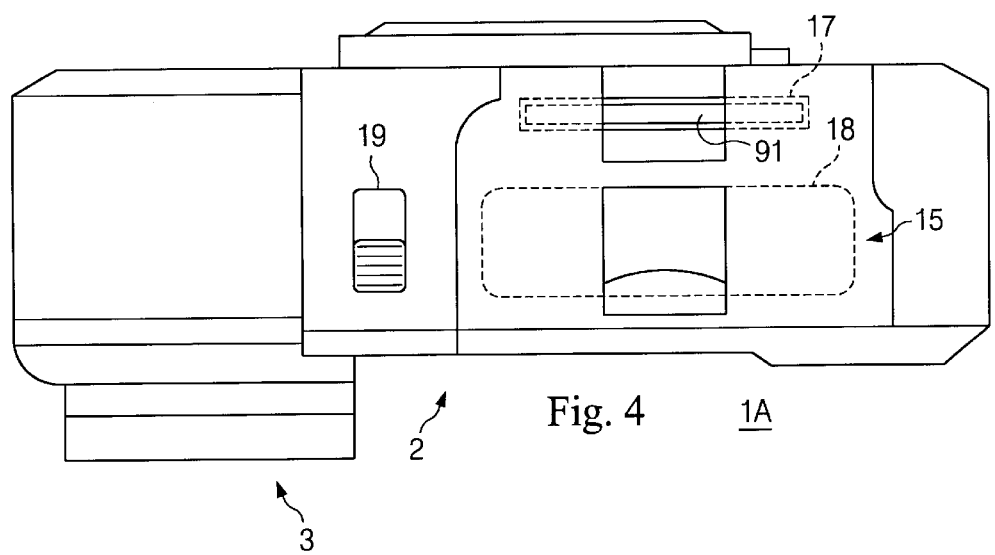
FIG. 4 is a bottom view of a digital camera of an embodiment of the present invention.
Figure 5:
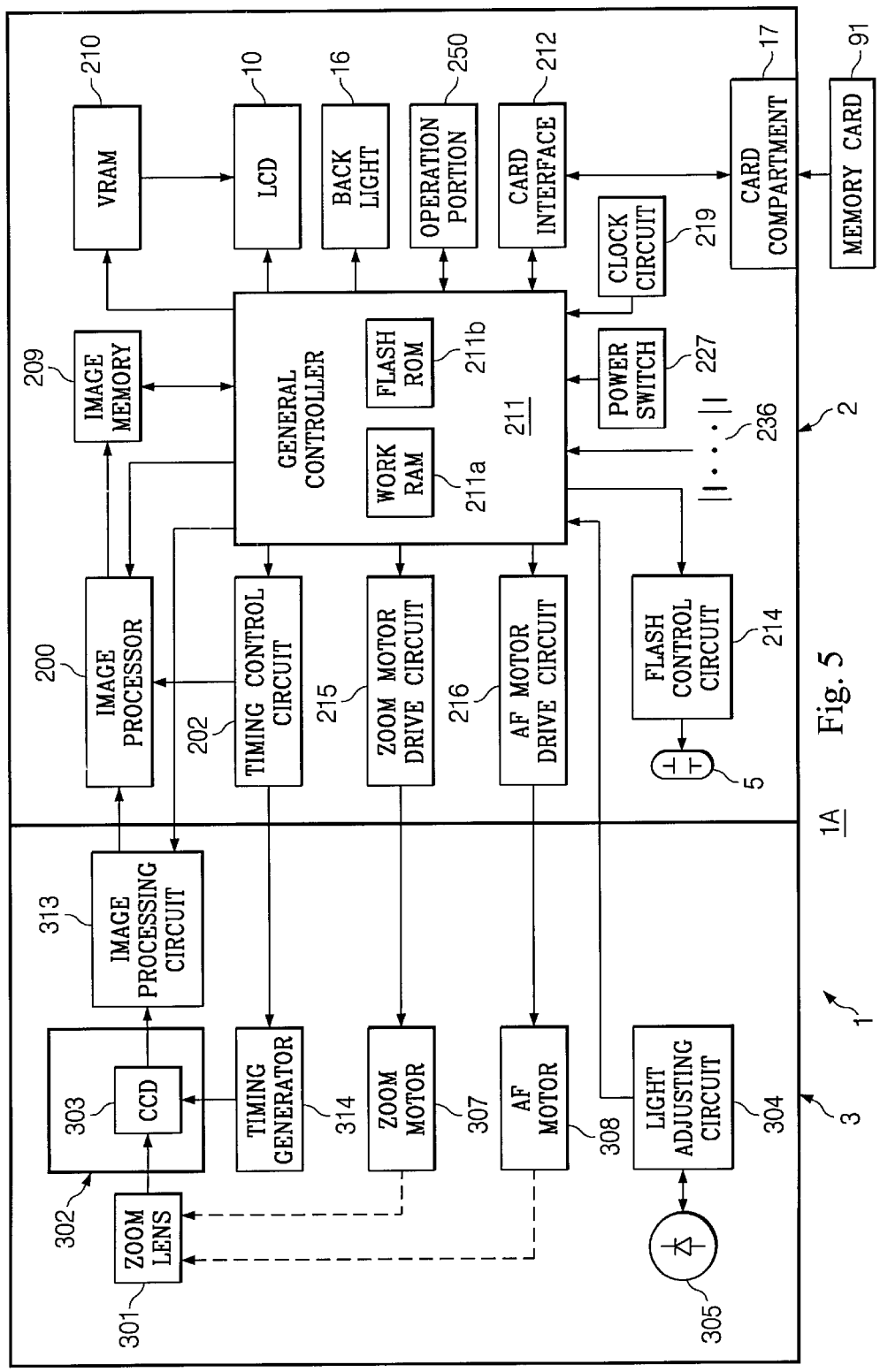
FIG. 5 is a block diagram showing the internal structure of the digital camera of an embodiment of the present invention.

On the bottom surface of the camera body 2 are provided a battery compartment 18 for loading a battery, and a card compartment 17, as shown in FIG. 4. The card compartment 17 has a slot-shaped insertion opening used for inserting a memory card 91 within the camera body 2 to allow writing and reading of image data to/from the memory card 91. Both compartments can be opened and closed using a clam-shell type door 15. FIG. 4 shows an example with a memory card 91 installed in the card compartment 17.

In the digital camera 1A, four AA-size dry cell batteries are installed in the battery compartment 18, and connected in series as to form the power source battery 236 (refer to FIG. 5) which is used as the drive source. Of course, electric power also may be supplied from an adapter using the DC input pin 235a shown in FIG. 3.

The bottom surface is also provided with release lever 19 for releasing the connection between the image sensing unit 3 and the camera body 2 which are connected by a connector and key-like connecting member.

The internal structure of the image sensing unit 3 is described below with reference to FIG. 5.

The image sensing circuit 302 photoelectrically converts an optical image of the photographic object formed on the CCD 303 by the zoom lens 301 using the CCD 303, and outputs the image as red (R), green (G), blue (B) color component image signals (signals comprising a signal series of pixel signals of the light received by each pixel).

Since the diaphragm is fixed in the digital camera 1A, exposure control in the image sensing unit 3 is accomplished by regulating the amount of exposure light of the CCD 303 (i.e., the load accumulation time of the CCD 303 corresponding to shutter speed). When a suitable shutter speed cannot be set when the photographic object luminance is a low luminance, unsuitable exposure due to insufficient exposure light can be corrected by adjusting the level of the image signal output from the CCD 303. That is, during times of low luminance, exposure can be controlled by combining shutter speed and gain adjustment. The image signal level adjustment is accomplished by the auto gain control circuit (AGC) within a signal processing circuit 313 described later.

A timing generator 314 generates a drive control signal for the CCD 303 based on a clock signal transmitted from a timing control circuit 202 within the camera body 2. The timing generator 314 generates clock signals, for example, such as a storage start/end timing signal (i.e., exposure start/end), read control signal (horizontal synchronization signal, vertical synchronization signal, transfer signal and the like) of each pixel photoreception signal and the like, and outputs these signals to the CCD 303.

The signal processing circuit 313 performs specific analog signal processing of image signals (analog signals) output from the image sensing circuit 302. The signal processing circuit 313 includes a correlation double sampling (CDS) circuit and an auto gain control (AGC) circuit, and reduces the noise of the image signals via the CDS circuit, and adjusts the level of the image signals by adjusting the gain via the AGC circuit.

The light adjusting control circuit 304 controls the amount of light emitted by the built-in flash 5 during flash photography to the specific amount of light emission set by the general controller 211 of the camera body 2. When the amount of received light attains the specific amount of emission light, a flash stop signal is output from the light adjusting control circuit 304 to the flash control circuit 214 via the general controller 211. The flash control circuit 214 forcibly stops light emission by the built-in flash 5 in response to the emission stop signal, and in this way the amount of light emitted from the flash 5 is controlled to the specific emission amount.

Within the image sensing unit 3 are provided a zoom motor 307 for moving the lens between a housed position and photography position and for changing the zoom ratio of the zoom lens 301, and an autofocus (AF) motor 308 for focus adjustment.

The internal structure of the camera body 2 is described below.

The general controller 211 mainly comprises a CPU, and controls each peripheral structure of the camera body 2 and the interior of the image sensing unit 3 connected by address bus, data bus, and control bus, and performs general control of photographic operations of the digital camera 1A.

The flow of the image data in FIG. 5 (and FIG. 6 described later) is indicated by arrows between the peripheral structures, but actually the image data are transmitted to each peripheral structure through the general controller 211. For this reason within the general controller 211 are provided a DRAM work RAM 211a and a flash ROM 211b for storing control programs.

The structures within the camera body 2 relating to image signal processing and image display are described below.

Figure 6:
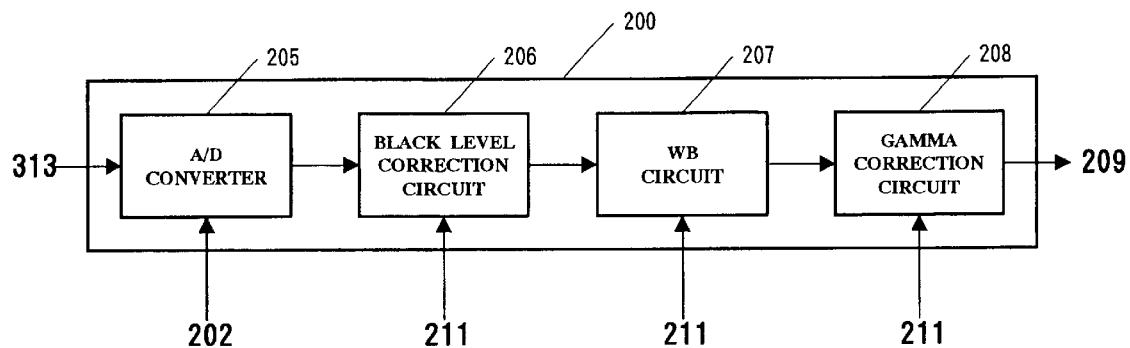
FIG. 6 is a block diagram showing the structure of the image processor.

Analog image signals transmitted from the signal processing circuit 313 of the image sensing unit 3 are subjected to various image processing in the image processor 200 within the camera body 2. FIG. 6 is a block diagram showing the structure of the image processor 200. First, the analog image signal transmitted to the image processor 200 is converted to a 10-bit digital signal for each pixel in the A/D converter 205. The A/D converter 205 converts each pixel signal (analog signal) to a 10-bit digital signal based on the clock signal of the A/D converter input from the timing control circuit 202.

The timing control circuit 202 generates a standard clock signal, and clock signals for the timing generator 314 and A/D converter 205 via control by the general controller 211.

A black level correction circuit 206 corrects the black level of the A/D converted pixel signal (hereinafter referred to as "pixel data") to a standard black level. A WB circuit 207 performs level conversion of the pixel data of each color component R, G, B, and adjusts the white balance in consideration of gamma correction in a later process. The white balance adjustment is accomplished using a level conversion table (properly speaking, the data of the table) input from the general controller 211 to the WB circuit, and the conversion coefficient (characteristics slope) of each color component of the level conversion table is set for each photographic image by the general controller 211.

A gamma correction circuit 208 corrects the gamma characteristic of the pixel data. The output from the gamma correction circuit 208 is transmitted to an image memory 209 as shown in FIG. 5.

The image memory 209 is a memory for storing pixel data output from the image processor 200, and has a 1-frame memory capacity. That is, the image memory 209 has a memory capacity sufficient to store pixel data of n×m pixels when the CCD 303 has pixels arrayed in a matrix of n lines and m columns (where n and m are natural numbers), and stores the pixel data in a corresponding memory area (address).

A VRAM 210 is a buffer memory for image data reproduced and displayed on the LCD 10. The VRAM 210 has a memory capacity sufficient to store image data corresponding to the number of pixels of the LCD 10.

According to this construction, in the photographic standby state of the photography mode, when the LCD button 321 sets the LCD display ON, pixel data of the image sensed for each specific interval by the image sensing section 3 are processed by the image processor 200, and stored in the image memory 209. The image data stored in the image memory 209 are then transferred through the general controller 211 to the VRAM 210, and displayed on the LCD 10 (live view display). In this way the photographer is able to verify the object image by the image displayed on the LCD 10.

In the reproduction mode, after the image read from the memory card 91 has been subjected to specific signal processing by the general controller 211, the data are transmitted to the VRAM 210 and reproduced and displayed on the LCD 10. When an image is displayed on the LCD 10, a backlight 16 is lighted via control by the general controller 211.

Another structure within the camera body 2 is described below.

A card I/F 212 is an interface for bi-directional communication with various types of memory cards installed in the card compartment 17. Specifically, writing image data to the memory card 91, and reading image data from the memory card 91.

A flash control circuit 214 is a circuit for controlling the emission of the built-in flash 5. The flash control circuit 214 controls the emission or lack thereof, emission amount, and emission timing of the built-in flash 5 by controlling (described later) the power supplied to the built-in flash 5 based on control signals from the general controller 211. Furthermore, flash control circuit 214 controls the amount of emission of the built-in flash 5 based on an emission stop signal input from the light adjusting control circuit 304.

A clock circuit 219 manages the photograph date and time, and is driven by a separate battery not shown in the drawings.

Within the camera body 2 are provided a zoom motor drive circuit 215 and AF motor drive circuit 216 for driving the zoom motor 307 and the AF motor 308. These circuits function by the operation of an operating portion 250 of a shutter button 8 and various other types of switches and buttons described above.

For example, the shutter button 8 is a two-stage switch capable of detecting the half-depression state, and full-depression state used by cameras using silver halide camera. When the shutter button 8 is depressed half way in the photography standby state, the general controller 211 calculates an AF evaluation value from the image data stored in the image memory as described later, and the AF motor drive circuit 216 drives the AF motor 308 in accordance with the specification of the general controller 211 based on the evaluation value so as to move the zoom lens 301 to a focus position and accomplish autofocusing.

Details of the AF method in the digital camera 1A of the present embodiment are described below. The digital camera 1A executes autofocusing by a contrast AF method, which focuses by determining an approximate value of the contrast of all image data by the general controller 211, and moving the zoom lens 301 accordingly.

Figure 7:
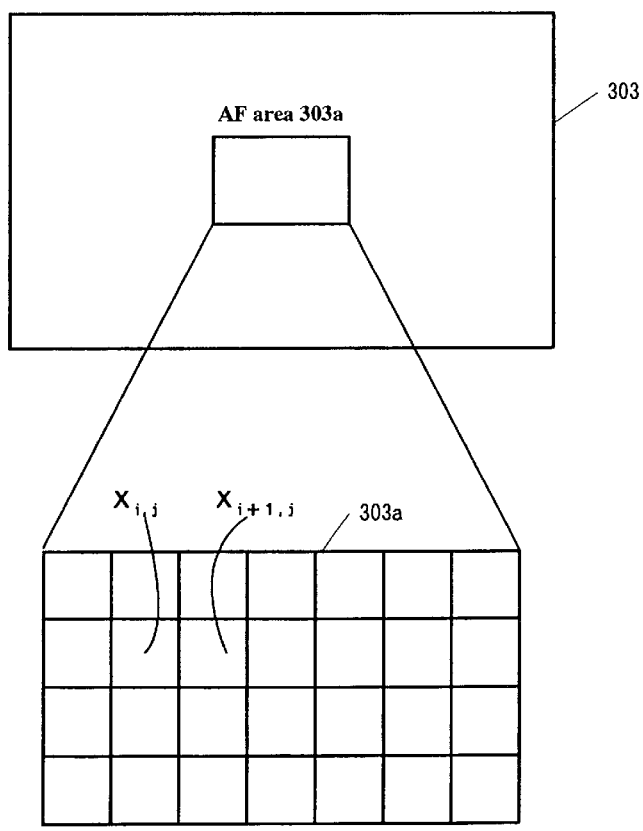
FIG. 7 shows the calculation of the AF evaluation value.

The calculation of the AF evaluation value is described below. FIG. 7 shows the mode of calculation of the AF evaluation value. The general controller 211 reads partial image data only of a square region AF area 303a at the center of the image from among the image data obtained by the CCD 303 and recorded in the image memory 209, and determines the AF evaluation value Xn as described below.

Each pixel value of the partial image data is represented as $X_{ij}$ (where and j are indices of each pixel specifying the line and column direction; and i and j specify each pixel within the partial image by being respectively different). When the differential value $\Delta ij$ is expressed as $\Delta ij = X_{i+1,j} - X_{ij}$, the AF evaluation value Xn is determined by the following equation.

$$Xn = \Sigma |\Delta ij|$$

$\Sigma$ represents the sum of the indices i and j which represent all pixels within the AF area 303a. That is, the AF evaluation value Xn represents the contrast of the partial image (accordingly, it is an approximate contrast value of the image data of the entire image recorded in image memory 209).

Figure 8:
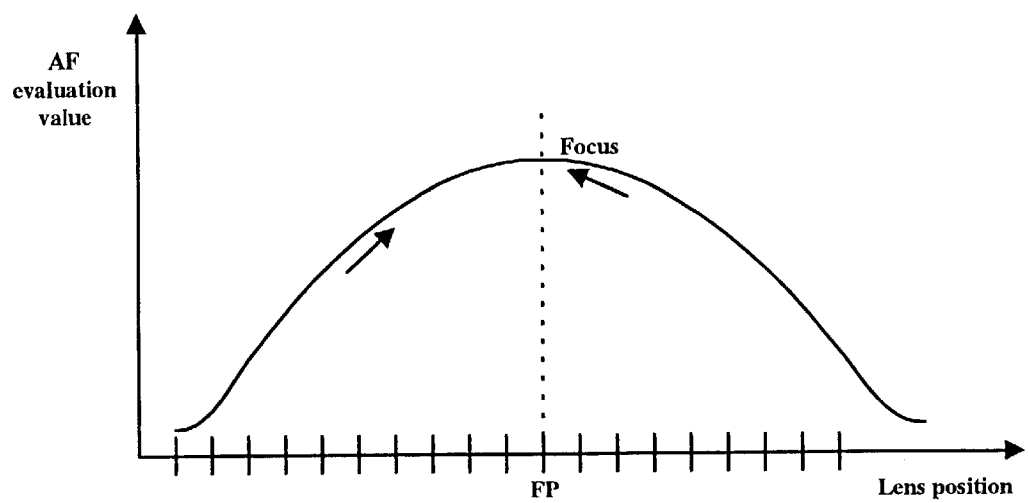
FIG. 8 shows the focus determination by the AF evaluation value.

FIG. 8 shows the mode of focus determination using the AF evaluation value. The horizontal direction in FIG. 8 represents the lens position of the zoom lens 301 and the maximum position of the AF evaluation value is the focus position FP. When the lens position moves in the direction of increasing AF evaluation value in specific steps (single steps in this embodiment), the zoom lens 301 soon passes the focus position, and the AF evaluation value starts to decrease as movement continues in that direction. Then, the general controller 211 monitors the increase and decrease of the AF evaluation value, and determines the zoom lens 301 has attained the focus position when the AF evaluation value attains a maximum, and stops the movement of the lens. The digital camera 1A uses this contrast AF method.

The explanation returns now to the structure. When buttons 231 and 232 are pressed, the signal from the buttons is transmitted to the general controller 211, and the zoom motor drive circuit 215 drives the zoom motor 307 in accordance with the specification of the general controller 211 so as to move the zoom lens 301 for zooming.

Although the various structures within the camera body 2 have been described above, the general controller 211 accomplishes various other functions such as timing control and transfer of data with peripheral structures through software.

For example, the general controller 211 is provided with a luminance detection and determining function and a shutter speed setting function for setting the exposure control value (shutter speed) and estimating the amount of light emission. In the photographic standby state, the luminance detection and determining function detect and determine the brightness of an object using image data stored in the image memory 209 captured every 1/30 sec by the CCD 303. The specific method of luminance detection totals or averages the luminance value of each color component R, G, B of the image data for the entire image. The shutter speed setting function sets the shutter speed (integral time of the CCD 303) based on the determination result of the object brightness determined by the luminance determination.

The general controller 211 is provided with a filtering process function, recorded image generation function, and reproduction image generation function to accomplish the photographic image recording process.

The filtering process function corrects the high frequency component of the image being recorded via a digital filter to correct image quality relating to contour.

The recording image generation function reads the pixel data from the image memory 209, and generates a thumbnail image and compressed image to be recorded on the memory card 91. Specifically, pixel data are read for each 8 pixels in both horizontal and vertical directions while scanning from the image memory 209 in the raster scan direction. Next, a thumbnail image is generated and transferred to the memory card 91 and recorded on the memory card 91. When recording the compressed image data on the memory card 91, all pixel data are read from the image memory 209, subjected to a specific compression processing by a JPEG method such as Hoffman coding or two-dimensional DCT conversion, and recorded on the memory card 91.

The specific operation in the recording process is described below. When a photograph is specified by the shutter button 8 in the photography mode, a thumbnail image of the image in the image memory 209 is generated, and a compressed image compressed by a JPEG method is generated based on the set compression ratio, and both images together with tag information relating to the photographed image (information such as frame number, exposure value, shutter speed, compression ratio, date, time, flash ON/OFF data, scene information, image determination result and the like) are recorded on the memory card 91.

The reproduction image generation function generates a reproduced image by expanding the compressed image recorded on the memory card 91. The specific operation is described below. When the mode setting switch 14 sets the reproduction mode, the image data of the highest frame number in the memory card 91 are read and expanded, and transferred to the VRAM 210. In this way the image of the highest frame number, i.e., the latest photographed image, is displayed on the LCD 10.

As shown in FIG. 5, when a memory card 91 is loaded and the digital camera 1A executes the photography process and regeneration process, the control of each section is executed by the general controller 211, but the control programs for executing these controls are installed beforehand in a flash ROM 211b within the general controller 211.

Figure 9:
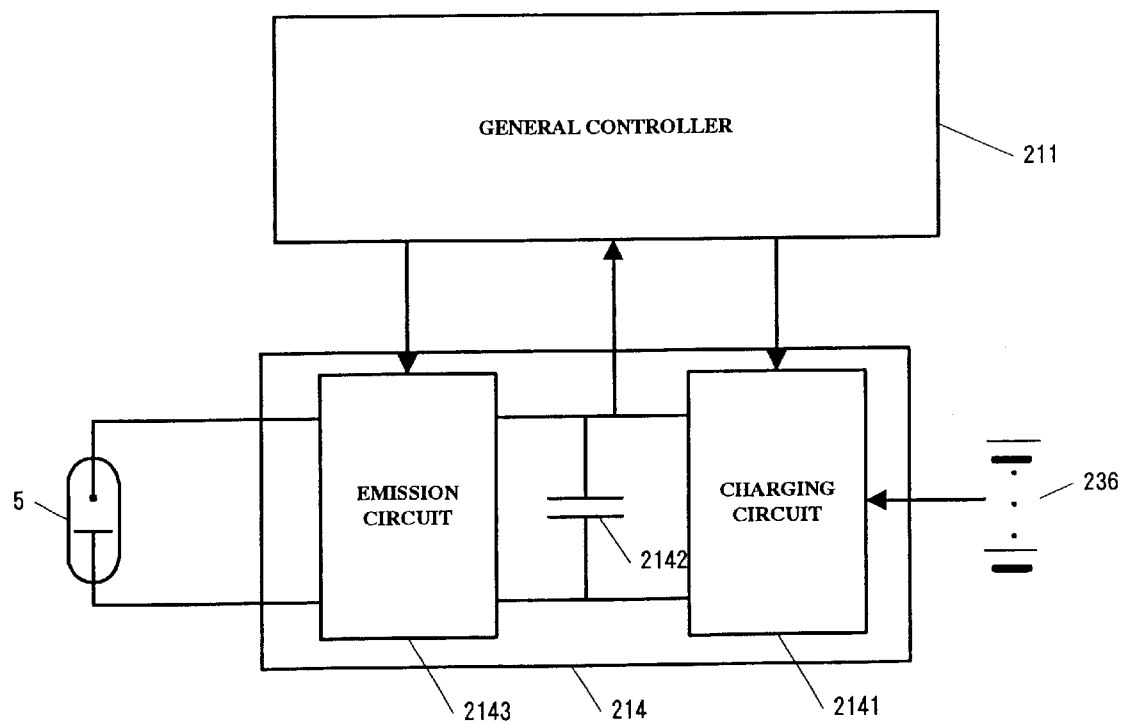
FIG. 9 is a block diagram of the periphery of the flash control circuit in the digital camera of a first embodiment.

Details of the structure and operation of the flash control circuit are described below. FIG. 9 is a block diagram of the periphery of the flash control circuit 214 of the digital camera 1A of a first embodiment. As shown in FIG. 9, a charging circuit 2141 for a main condenser 2142 is included within the flash control circuit 214.

The charging circuit 2141 is a circuit for charging the main condenser 2142 with a load (energy) necessary for light emission of the built-in flash 5. Control of the amount of charge is accomplished by the general controller 211 which monitors the charging such that the charge level of the main condenser 2142 is constantly monitored. That is, when the charge level of the main condenser 2142 attains a standard value described later, the charging is stopped.

After charging is completed, if there is a photographic operation as described previously, an emission start signal is transmitted from the general controller 211 to an emission circuit 2143 to induce emission by a xenon tube in the built-in flash 5 synchronously with the exposure of the CCD 303. Then, the load charged in the main condenser 2142 flows to the xenon tube and emission is executed.

The light from the flash is reflected by the object and impinges a luminance control sensor 305 shown in FIG. 5, and when the general controller 211 detects that the amount of light of the flash has attained a predetermined value, the general controller 211 transmits an emission stop signal to the emission circuit 2143 to stop the light emission. When the emission circuit 2143 receives the emission stop signal, the current flowing to the xenon tube is cut off and emission is stopped.

After image sensing, the general controller 211 starts recharging by the charging circuit 2141 to attain a sufficient charge level in the main condenser 2142. When the charge is insufficient, disadvantages arise insofar as the amount of light emission is inadequate, the image is underexposed, and worst of all there is poor light emission in spite of emission controls. To prevent this situation in the digital camera 1A, the general controller 211 executes controls to prohibit photography (release lock state) until the charge level of the main condenser 2142 attains a standard level as described later.

B. Photography Process

Figure 10:
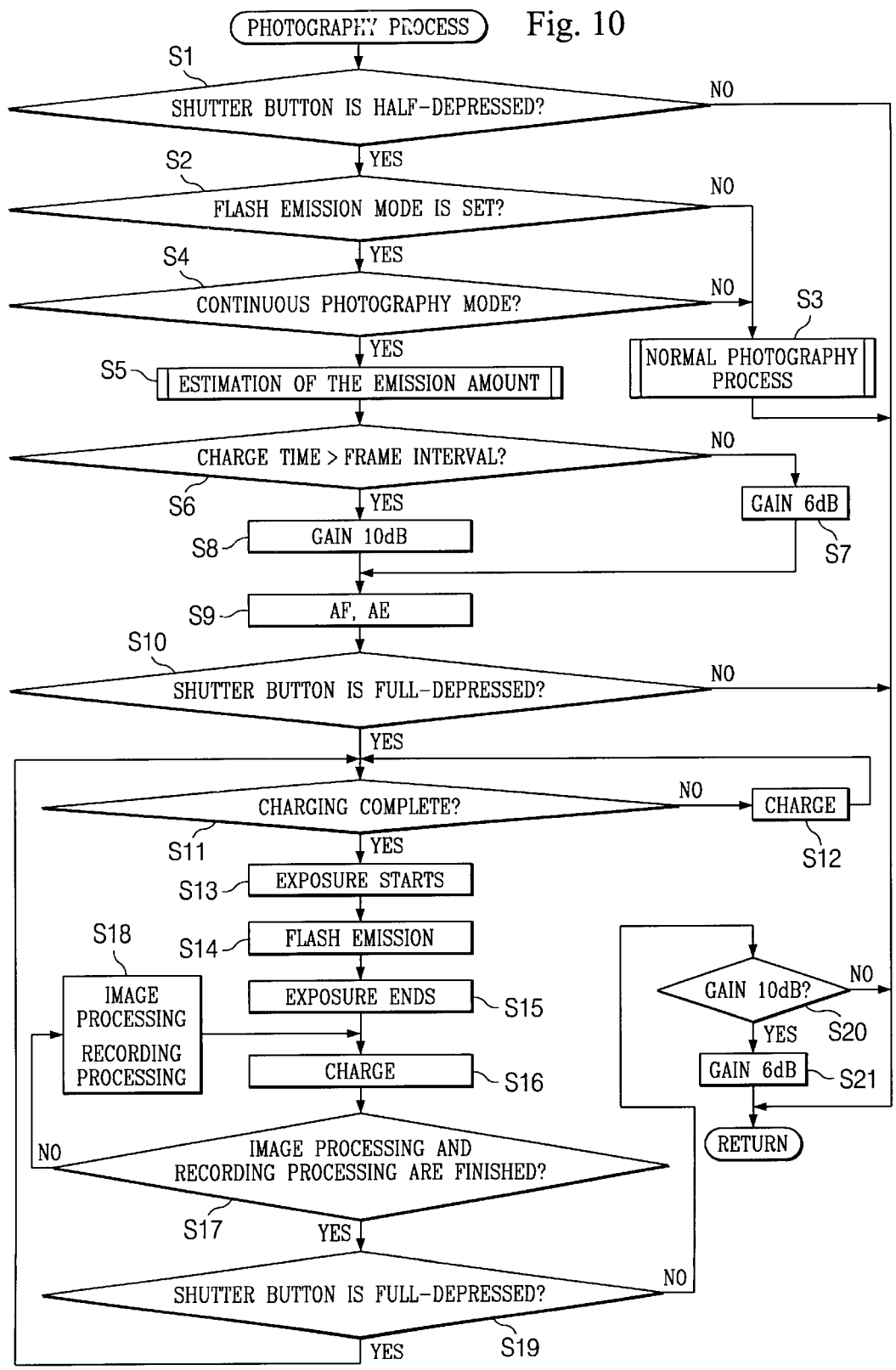
FIG. 10 is a flow chart showing the sequence of the photographic process.

The photography process in the digital camera 1A of the present embodiment is described below. FIG. 10 is a flow chart showing the sequence of the photography process. In the photography process, the general controller 211 controls each structure unless otherwise specified.

At the stage in which the photography mode is entered, when the LCD display is turned ON by setting of the LCD button 321, a live view is displayed on the LCD 10. The user then frames the scene and confirms it using the display. Conversely, when the LCD display is turned OFF by the setting of the LCD button 321, the user frames the scene using the optical finder 31.

First, a determination is made as to whether or not the user has half pressed the shutter button 8 (step S1); if the button has not been half pressed, the photography process ends. Conversely, if the shutter button 8 has been half pressed, the routine advances to the next step.

Then, a determination is made as to whether or not the flash emission mode is set for light emission (step S2). Specifically, the flash emission mode is determined to be set for light emission when the flash emission mode is set to either auto flash or forced flash by user operation of the key switch 222. The flash emission mode is determined to be set for no emission when the flash emission mode is flash prohibition mode.

Then, when the flash emission mode is set for no emission, the normal photography process is executed without light emission in the single photography or continuous photography modes (step S3), and the photography process ends. Conversely, when the flash emission mode is set for light emission, the routine advances to the next step.

Next, a determination is made as to whether or not the continuous photography mode is set (step S4). When the continuous photography mode is not set, the routine continues to step S3, and the previously described normal photography process is executed. Conversely, when the continuous photography mode is set, i.e., when continuous photography and flash emission mode for light emission are set, the routine continues to the next step.

Then, the estimation process of the emission amount (hereinafter referred to as "estimation process") is executed (step S5). The estimation process is described below.

Figure 11:
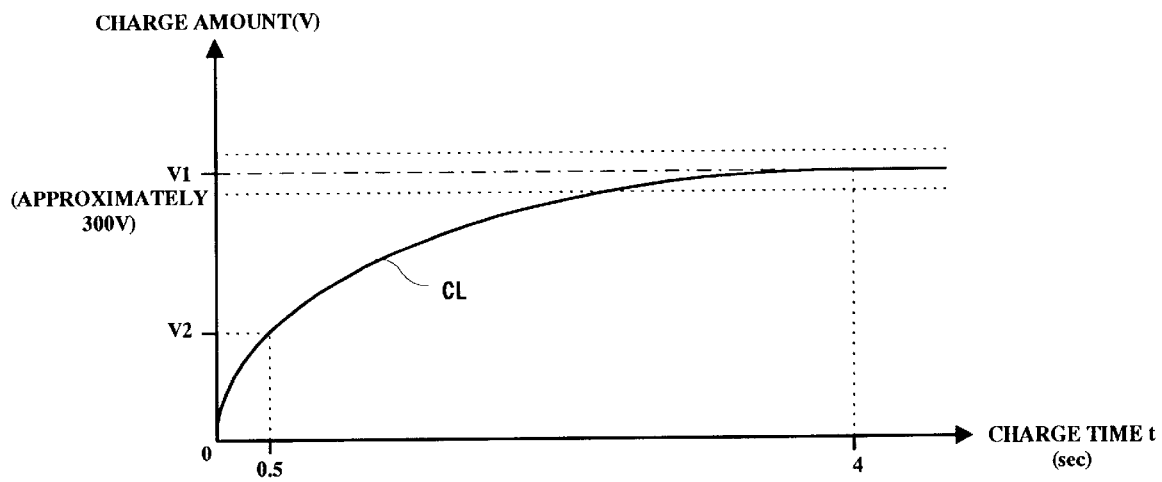
FIG. 11 illustrates the relationship between the charge amount and the charge time of the main condenser 214 in the digital camera of the first embodiment.

FIG. 11 shows the relationship between the charge time and the charge amount of the main condenser 2142 in the digital camera 1A of the first embodiment.

Generally, when using the majority of the electrical energy of the main condenser 2142 for light emission (full light emission) a considerable amount of time is required to charge the condenser for the next full light emission, i.e., a full charge. In contrast, when a small light emission rather than full light emission is used, the charge time changes depending on the amount of load remaining in the main condenser 2142. The smaller the light emission, the shorter the required charging time.

The curve CL which represents the relationship between the charge level (voltage) and the time required for charging from the full light emission condition is proportional to $1-\exp(t/CR)$ (wherein t represents the charging time, C represents the capacity of condenser, and R represents the resistance) as shown in FIG. 11.

Furthermore, the predetermined amount of the flash light entering the luminance control sensor 305 is set at a value such that the ultimate image data subjected to whatever image processing attains suitable exposure. This value is transmitted by, for example, serial communication to the luminance control sensor 305. This predetermined amount of flash is dependent on the gain adjustment value of the AGC circuit within the signal processing circuit 313 of FIG. 5. When the gain is large (i.e., high sensitivity), a small amount of impinging light is suitable, whereas when the gain is small (i.e., low sensitivity), a large amount of impinging light is suitable. Since a small amount of impinging light is suitable if a large gain value is set, for example, if a larger gain value is set during flash photography (high sensitivity), a small amount of light emission is appropriate.

That is, when the light emission amount is small, the charge amount (charge time) for the next photograph is small.

Particularly in the continuous photography mode, a short charging time is desirable so as to have preferential frame speed. Therefore, when the continuous photography mode and the flash emission mode are set in the digital camera 1A of the first embodiment, the AGC circuit gain is increased during flash photography. That is, the operation is similar to the increased ISO sensitivity of silver halide cameras, and the charging time is shortened to reduce the amount of light emission, and decrease the cause of slowing the frame speed.

Specifically, the standard gain is set at 6 dB as previously described, and this gain may be increased 16 times to 10 dB. In contrast, the charge voltage value required for light emission, i.e., the standard charge amount which is the voltage value determined at charge completion at the set gain, is different when the standard gain is set and when the gain is increased. That is, the standard charge amount V2 for increased gain is $\frac{1}{16}$ times the standard charge amount V1 for standard gain, as shown in FIG. 11. In the digital camera 1A of the first embodiment, the full charge time is 4 seconds, and the lowest charge time for light emission for gain increase is 0.5 seconds.

Image quality deteriorates if the gain is increased needlessly. If the amount of the main light emission is known before the main light emission of the main photograph, the gain can be increased only when it is determined that the charge time for light emission will reduce the frame speed. In this way the chance of a deterioration in image quality can be greatly reduced.

The first embodiment uses a method wherein the main light emission amount is known before the main light emission, i.e., a method for estimating the amount of the main light emission calculated based on the object luminance determined directly before by a pre-light emission in an estimation process.

Figure 12:
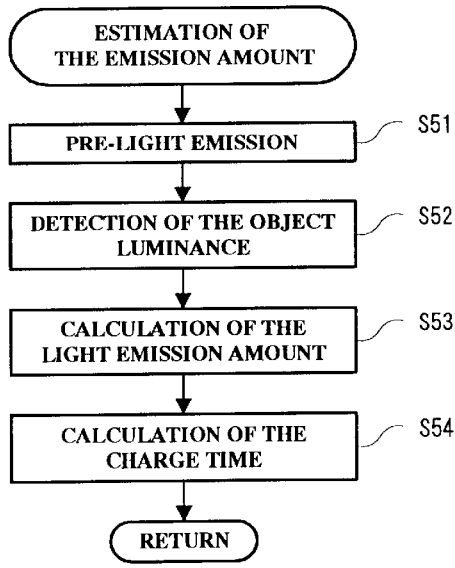
FIG. 12 is a flow chart showing the emission amount estimation process in the first embodiment.

FIG. 12 is a flow chart showing the estimation process in the first embodiment.

First, the built-in flash 5 performs a pre-light emission (step S51). The pre-light emission is a light emission performed by the built-in flash 5 to determine the object luminance during light emission, and is not a light emission for the main photograph. The pre-light emission is executed without light adjusting control, and is a single emission in one continuous photography performed by the built-in flash 5 for a specified flash amount (emission time) set beforehand and the amount of emission is less than the amount of emission for photography.

Next, the object luminance is detected from the image data obtained by the CCD 303 under the pre-light emission as previously described (step S52).

Then, the amount of light emission for main photography is calculated from the object luminance obtained during pre-light emission (step S53). Normally, the amount of light emission required to obtain object luminance demanded during actual photography is determined from the obtained object luminance and the amount of the pre-light emission.

The charge time of the main condenser 2142 is calculated in accordance with the amount of light emission determined in step S53 (step S54). The electrical energy accumulated in the main condenser 2142 is proportional to the square of the voltage of the main condenser 2142, and since the amount of the emission of the built-in flash 5 is proportional to the energy accumulated in the main condenser 2142, the amount of emission of the built-in flash 5 is proportional to the square of the voltage of the main condenser 2142. The general controller 211 calculates the charge time for the voltage of the main condenser 2142 and attains the light emission amount determined in step S53 using the aforesaid relationship (i.e., the relationship of the curve CL).

We return now to FIG. 10. When the estimation process ends, a determination is made as to whether or not the charge time is longer than the continuous frame interval (step S6). If the charge time is shorter than the continuous frame interval, the gain setting is maintained at the standard 6 dB (step S7), and the routine advances to step S9. Conversely, if the charge time is longer than the continuous frame interval, the gain setting is increased to 10 dB (step S8). That is, a gain setting 16 times higher is set as the standard gain. In the digital camera 1A, the continuous frame interval is 0.7 seconds. Accordingly, since the charge time for increased gain is a maximum of 0.5 seconds as shown in FIG. 11, charging during the increased gain can be accomplished between the photographs of the continuous frames in continuous photography.

Thereafter, the AF process and AE process are executed as previously described (step S9).

Then, a determination is made as to whether or not the shutter button 8 has been fully pressed by the user (step S10). If the shutter button 8 has not been fully pressed the photography process ends, whereas when the button has been fully pressed, the routine continues to the next step.

Next, a check is made to determine whether or not charging of flash is completed (step S11). If charging is not completed, charging continues (step S12), the routine returns to step S11 and the determination as to whether or not charging is completed is repeated. When it is determined that charging is completed, the routine advances to step S13.

The determination whether or not the charging is completed is accomplished by the general controller 211 reading the standard voltage amount recorded in the flash ROM 211*b*, and determining whether or not the voltage of the main condenser 2142 has attained a standard voltage V1 for the standard set gain, or attained the standard voltage V2 for increased gain.

Next, exposure starts (step S13), light emission is executed for main photography (step S14), and thereafter the exposure ends (step S15). This light emission is executed using the light emission amount obtained in the aforesaid estimation process.

Then, charging starts (step S16), a determination is made as to whether or not the image processing and recording processing are completed in parallel with the charging (step S17). If the image processing and recording processing are not completed, the image processing and recording processing are executed in the image processor 200 (step S18). Then, when it is determined that the image processing and recording processing are completed in step S17, the photograph of one image in continuous photography is completed.

Thereafter, a determination is made as to whether or not the user is fully pressing the shutter button 8 (step S19). If the shutter button 8 continues to be fully pressed, the processes of steps S11–S19 are repeated until the fully pressed shutter button 8 is released. In this way continuous photography is executed while the shutter button 8 is fully pressed.

Conversely, if at step S19 the shutter button 8 is released, a check is made to determine whether or not the gain is set at 10 dB (increased gain) (step S20). If the gain is not increased, the photography process ends, whereas when the gain is increased, the gain is restored to the standard 6 dB, and the photography process ends (step S21).

As previously described, in the first embodiment, the continuous frame interval is 0.7 seconds, such that during flash photography in the continuous photography mode, charging and image processing and recording processing are executed in parallel, and since the shortest charging time is 0.5 seconds for increased gain, the main factor in determining the continuous frame interval is the time required for image processing and recording processing. That is, charging is normally controlled so as to be completed at the stage wherein the image processing and recording processing are completed.

In this instance, when the photography process ends, the next photography process starts, or the mode moves to the reproduction mode to reproduce a recorded image by an operation pursuant with the desire of the user, or the mode moves to the preference mode.

According to the first embodiment as described above, in flash photography and the continuous photography mode, the gain is increased when it is determined that the charging time will reduce the continuous frame speed. Therefore, the amount of light emission required is small, and since the time needed to complete the charging of flash is shorter, the time until the start of photography of the next frame is reduced, and the continuous frame speed can be increased for flash photography.

Furthermore, since the amount of the light emission during flash photography is determined based on the object luminance under pre-light emission by the built-in flash 5, the object luminance under light emission does not require a special calculation, such that the amount of emission can be easily calculated.

After photography ends in the continuous mode, the gain is returned to the original value before the next photography to prepare for the next standard photograph.

2. Second Embodiment

In the second embodiment, the device structure and photography processes are substantially identical to those of the first embodiment, with the exception of the specific process of the estimation process (FIG. 10, step S5). That is, the estimation process of the second embodiment uses a method which determines the distance from the AF result to the object, and estimates the main light emission amount from this measurement result and the object luminance obtained without a pre-light emission.

FIG. 13 is a flow chart showing the estimation process of the second embodiment. The estimation process of the second embodiment is described in detail below with reference to FIG. 13.

First, the AF process is executed using a contrast AF method identical to the AF of the first embodiment (step S61). At this time the distance from the CCD 303 to the object is determined based on the position of the zoom lens 301. Specifically, since the position of the zoom lens 301 is managed by the general controller 211, the distance to the object can be determined from the lens position information in the general controller 211 and the focal length at each lens position which is known beforehand.

Then, the object luminance is detected (step S62). The object luminance is an object luminance obtained based on the image data obtained by the CCD 303 without a pre-light emission, i.e., without a light emission.

Next, the light emission amount for main photography is calculated from the object distance information and the object luminance obtained without light emission (step S63). Specifically, in order to obtain a suitable object luminance required for main photography, the difference is determined between the suitable object luminance and the object luminance without light emission, and the amount of light emission equivalent to this difference is determined. At this time the distance information obtained beforehand is used, and the intensity of the light is considered to be inversely proportional to the square of the distance from the light source, such that the amount of light emission is determined by reverse calculation from the amount of light at the position of the CCD 303 required to obtain the aforesaid suitable object luminance.

Then, the charging time is calculated from the amount of light emission obtained in step S63 (step S64). The process of step S64 is identical to the estimation process of the first embodiment (FIG. 12, step S54).

The charging time is calculated in the same way as in the first embodiment based on the aforesaid light emission time, the gain is adjusted based on the relationship between the charge time and the continuous frame speed, and then continuous photography is executed under the light emission.

In the second embodiment described above, the gain is increased when it is determined that the charge time will reduce the continuous frame speed during flash photography in the continuous mode. Therefore, a small emission is required for the light emission, and since the time used to complete the charging is small, the time until the start of the next photography is reduced, and the continuous frame speed can be increased in flash photography.

Furthermore, power consumption is conserved because a pre-light emission by the built-in flash 5 is unnecessary to determine the object luminance since the amount of emission during flash photography is based on the distance to the object and the object luminance.

3. Modification

Although the digital cameras of the aforesaid embodiments have been described by way of examples, the present invention is not limited to these examples.

For example, in the above embodiments, the gain is increased only when it is determined that the charging time will reduce the continuous frame speed in flash photography and the continuous mode. However, the present invention is not limited to this arrangement inasmuch as the gain may be normally increased for flash photography in the continuous mode and the amount of light emission may be reduced without determining whether or not the charging time will reduce the continuous frame speed.

Furthermore, in the second embodiment, the contrast AF method is executed to determine the distance to the object, and the distance to the object is determined based on the zoom lens position at AF. However, the present invention is not limited to this arrangement inasmuch as a distance measuring sensor using a phase difference detection method may be provided, so as to determine the distance to the object by a phase difference detection method.

According to the present invention as described above, the gain is increased for flash photography in the continuous mode. Therefore, the light emission amount needed for light emission is small, and the time until the completion of the flash charging is reduced. As a result, the time until the photograph of the next frame is reduced, and the continuous frame speed can be increased in flash photography.

Since the gain is increased when it is determined that the continuous frame speed is reduced, the continuous frame speed can be increased in flash photography.

Furthermore, since the detection of the emission amount is accomplished using object luminance, in a digital camera provided with an image sensing element, the object luminance can be easily determined from the output signal of the image sensing element, such that the emission amount is readily detectable.

Since the amount of light emission during flash photography is determined based on the object luminance under the pre-light emission, the object luminance under light emission can be determined without special calculation, and the emission amount is easily calculated.

Power consumption is conserved because it is unnecessary to determine object luminance under light emission since the amount of emission during flash photography is determined based on the distance to the object and object luminance.

Furthermore, since the gain is reset to the original value after flash photography ends in the continuous mode, the next standard photography is prepared.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A digital camera having a continuous photography mode, comprising:

an image sensor for sensing an image of an object;

a light emission device for illuminating the object during a photographing operation;

a chargeable power source for supplying power to the light emission device;

an adjustor for adjusting a gain of an output of the image sensor;

a determining portion for determining an amount of light emission of the light emission device for the photographing operation;

a charge time calculator for calculating a charge time, needed after light emission, of the chargeable power source based on the thus determined amount of light emission;

a discriminator for discriminating whether or not a frame speed in the continuous photography mode would be reduced based on the thus calculated charge time; and a gain controller for controlling the adjuster so as to increase the gain when it has been discriminated that the frame speed would be reduced.

2. A digital camera according to claim 1, wherein the determining portion determines the amount of light emission based on a luminance of the object.

3. A digital camera according to claim 2, wherein the determining portion comprises a light emission controller for executing a pre-light emission by the light emission device before the photographing operation and a luminance detector for detecting the luminance of the object under the pre-light emission, and the determining portion determines the amount of light emission based on the thus detected object luminance.

4. A digital camera according to claim 2, wherein the determining portion comprises a luminance detector for detecting the luminance of the object and a distance detector for detecting a distance to the object, and the determining portion determines the amount of light emission based on the thus detected object luminance and the thus detected distance.

5. A digital camera according to claim 1, wherein the gain controller restores the gain to an original value after the photographing operation.

6. A method of gain control of a digital camera having a continuous photography mode, comprising the steps of:

determining an amount of light emission device for a photographing operation;

calculating a charge time, needed after light emission, of a power source of the light emission device based on the thus determined amount of light emission;

discriminating whether or not a frame speed in the continuous photography mode would be reduced based on the thus calculated charge time; and controlling a gain of output of an image sensor element so as to increase the gain when it has been discriminated that the frame speed would be reduced.

* * * * *